US010287440B2

(12) United States Patent
Blumenau et al.

(10) Patent No.: US 10,287,440 B2
(45) Date of Patent: May 14, 2019

(54) STEEL PRODUCT WITH AN ANTICORROSIVE COATING OF ALUMINUM ALLOY AND METHOD FOR THE PRODUCTION THEREOF

(71) Applicants: ThyssenKrupp Steel Europe AG, Duisburg (DE); ThyssenKrupp AG, Essen (DE)

(72) Inventors: Marc Blumenau, Dortmund (DE); Oliver Moll, Wesel (DE); Michael Peters, Kleve (DE); Thiemo Wuttke, Recklinghausen (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 118 days.

(21) Appl. No.: 15/326,407

(22) PCT Filed: Jun. 30, 2015

(86) PCT No.: PCT/EP2015/064820
§ 371 (c)(1),
(2) Date: Jan. 13, 2017

(87) PCT Pub. No.: WO2016/008714
PCT Pub. Date: Jan. 21, 2016

(65) Prior Publication Data
US 2017/0198152 A1 Jul. 13, 2017

(30) Foreign Application Priority Data
Jul. 16, 2014 (DE) .................. 10 2014 109 943

(51) Int. Cl.
C09D 5/08 (2006.01)
C09D 1/00 (2006.01)
C23C 2/12 (2006.01)
C23C 2/02 (2006.01)
C23C 2/26 (2006.01)
C22C 21/02 (2006.01)
C22C 21/06 (2006.01)
C23C 28/00 (2006.01)
C25D 11/16 (2006.01)

(52) U.S. Cl.
CPC .............. C09D 5/08 (2013.01); C09D 1/00 (2013.01); C22C 21/02 (2013.01); C22C 21/06 (2013.01); C23C 2/02 (2013.01); C23C 2/12 (2013.01); C23C 2/26 (2013.01); C23C 28/321 (2013.01); C23C 28/345 (2013.01); C25D 11/16 (2013.01)

(58) Field of Classification Search
None
See application file for complete search history.

(56) References Cited

U.S. PATENT DOCUMENTS

| 3,639,107 A | 2/1972 | Thompson |
| 3,841,894 A | 10/1974 | Leonard |
| 3,923,557 A | 8/1975 | Anthony et al. |
| 4,826,657 A | 5/1989 | Wilde et al. |
| 5,789,089 A | 8/1998 | Maki et al. |
| 2006/0099332 A1 | 5/2006 | Eriksson et al. |
| 2008/0138615 A1 | 6/2008 | Kolberg et al. |
| 2008/0308191 A1 | 12/2008 | Leuschner et al. |
| 2010/0203357 A1* | 8/2010 | Hori .................. C22C 21/02 428/653 |
| 2011/0300407 A1 | 12/2011 | Cho et al. |
| 2013/0180305 A1 | 7/2013 | Warnecke et al. |
| 2014/0125296 A1 | 5/2014 | Chassard et al. |
| 2014/0205857 A1* | 7/2014 | Goto .................. C23C 2/12 428/653 |
| 2014/0251505 A1 | 9/2014 | Blumenau et al. |
| 2015/0345002 A1 | 12/2015 | Blumenau et al. |

FOREIGN PATENT DOCUMENTS

| BE | 1014997 A3 | 8/2004 |
| CN | 101538670 A | 9/2009 |
| CN | 102348824 A | 2/2012 |
| CN | 102758162 A | 10/2012 |
| DE | 69603782 T2 | 3/2003 |
| DE | 102004059566 B3 | 8/2006 |
| DE | 102009044861 B3 | 6/2011 |
| DE | 102011051731 B4 | 1/2013 |
| DE | 102012101018 B3 | 3/2013 |
| EP | 0575926 A1 | 12/1993 |
| EP | 2719070 B1 | 4/2014 |
| GB | 2452552 A | 3/2009 |
| JP | 4259363 A | 9/1992 |
| JP | 8325693 A | 12/1996 |
| JP | 2004238682 * | 8/2004 |
| JP | 2005238286 A | 9/2005 |
| JP | 2005272967 A | 10/2005 |
| JP | 2006183126 A | 7/2006 |
| JP | 2006299377 A | 11/2006 |
| JP | 2011137210 A | 7/2011 |
| WO | 2006/050915 A2 | 5/2006 |
| WO | 2007/117270 A2 | 10/2007 |
| WO | 2009030823 A1 | 3/2009 |
| WO | 2013089262 A1 | 6/2013 |

OTHER PUBLICATIONS

International Search Report for PCT/EP2015/064820 (dated Aug. 19, 2015).

(Continued)

Primary Examiner — Daniel J. Schleis
(74) Attorney, Agent, or Firm — The Webb Law Firm

(57) ABSTRACT

A steel product may include a metallic anticorrosion coating of an aluminum alloy. So that such a steel product possesses high media resistance, more particularly high acid resistance and corrosion resistance, the steel product may be immersed in a liquid-melt coating bath that includes an aluminum alloy. In addition to Aluminum and unavoidable impurities, the aluminum alloy may include at least one of 0.2-2% by weight Mn or 0.2-7% by weight Mg, 0.5-5% by weight Fe, and at least one of 0.05-0.4% by weight Ti or 0.05-0.4% by weight Zr. A method for producing such steel products may involve providing a steel product in a hot-rolled or cold-rolled state, activating a surface of the steel product to remove passive oxides, and coating the surface-activated steel product by immersion in a liquid-melt coating bath that comprises an aluminum alloy having the aforementioned composition.

3 Claims, No Drawings

(56) References Cited

OTHER PUBLICATIONS

Aluminium-Taschenbuch; Band 1, 15th ed. Dusseldorf: Aluminum-Verlag, 1995, pp. 103-105 and 134-137.
Bergmann. Werkstofftechnik 2: Werkstoffherstellung—Werkstoffverarbeitung—Werkstoffanwendung, Carl Hanser Verlag, 2009: pp. 452-457.
Luther et al. Surface conditioning of a cold-rolled dual-phase steel by annealing in nitriding atmospheres prior to hot-dip galvanizing, Advanced Engineering Materials, 9 (2007) 4, pp. 274-279.
Moeller. Elvira Moeller. Handbuch Konstruktionswerkstoffe Auswahl, Eigenschaften, Anwendung., Carl Hanser Verlag, 2010: pp. 357-358.

* cited by examiner

STEEL PRODUCT WITH AN ANTICORROSIVE COATING OF ALUMINUM ALLOY AND METHOD FOR THE PRODUCTION THEREOF

CROSS REFERENCE TO RELATED APPLICATIONS

This application is a U.S. National Stage Entry of International Patent Application Serial Number PCT/EP2015/064820, filed Jun. 30, 2015, which claims priority to German Patent Application No. DE 10 2014 109 943.5 filed Jul. 16, 2014, the entire contents of both of which are incorporated herein by reference.

FIELD

The invention relates to steel products and methods for producing steel products, including flat steel products that have metallic anticorrosion coatings of aluminum alloys.

BACKGROUND

Flat steel product is understood in the present context to refer to steel products whose width and length are each a multiple of their thickness. An example of a flat steel product is a steel strip or steel blank.

The corrosion resistance of aluminum is influenced substantially by the covering layer of $Al_2O_3$ which forms on aluminum, and by the stability of this layer. Aluminum corrodes only in strongly acidic media or alkaline solutions. The service range for aluminum alloys is therefore typically confined to the pH range of 5-8. Exceptions exist, in this respect, in relation to concentrated oxygen-containing acids such as nitric, acetic, and phosphoric acid. Moreover, the resistance of aluminum in $NH_3$ solutions is good to very good.

Aluminum coatings for steel products are employed primarily in the form of AlSi alloys as a protection from scaling in high-temperature applications. The objective of AlSi coating, for example, is to prevent the scaling of steel sheets in the process of hot forming. As a result of hot forming (press hardening), the coating becomes brittle and then no longer affords satisfactory corrosion prevention.

However, coatings of AlSi alloys afford only moderate corrosion protection even when they are not hot-formed.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Against the background set forth above, one example object of the present disclosure is to provide a steel product and, in some examples, a flat steel product, which possesses high media resistance and, in some cases, high acid resistance and corrosion resistance.

The steel product of the invention, more particularly flat steel product, is provided with a metallic anticorrosion coating of an aluminum alloy, the aluminum alloy comprising, further to Al and unavoidable impurities, the following elements:

|         | Mn | 0.2-2 wt % |
| --- | --- | --- |
| and/or  | Mg | 0.2-7 wt % |
|         | Fe | 0.5-5 wt % as obligatory element |
|         | Ti | 0.05-0.4 wt % |
| and/or  | Zr | 0.05-0.4 wt %. |

The method of the invention is characterized accordingly by the following steps:

providing a steel product, more particularly flat steel product, in a hot-rolled or cold-rolled state, activating the surface of the steel product to remove passive oxides from the surface of the steel product, and coating the surface-activated steel product by immersion in a liquid-melt coating bath which contains an aluminum alloy which, further to Al and unavoidable impurities, is composed of the following elements:

|         | Mn | 0.2-2 wt % |
| --- | --- | --- |
| and/or  | Mg | 0.2-7 wt % |
|         | Fe | 0.5-5 wt % as obligatory element |
|         | Ti | 0.05-0.4 wt % |
| and/or  | Zr | 0.05-0.4 wt %. |

The effect of manganese (Mn) is that iron-containing phases or needles are bound or converted into a less harmful morphology, thereby significantly boosting the corrosion resistance in comparison to other aluminum-based coatings. At an Mn content of less than 0.2 wt % in the liquid-melt coating bath, the inventors were unable to find this positive effect. An Mn content of more than 7.0 wt % did not improve this effect further, instead leading to increased formation of slag in the coating bath (melt bath), which may adversely affect the quality of the coating. Starting from an Mn content of 0.2 wt %, an increase in the hot strength was found with increasing Mn content. This may well be because of the recrystallization-inhibiting effect of manganese.

Magnesium (Mg) as an alloying element may have the effects both of solid solution hardening and, in conjunction with other alloying elements (e.g., silicon), of precipitation hardening. The inventors have found aluminum alloys having an Mg content of up to 7 wt % to exhibit high corrosion resistance. From an Mg content of 5 wt % or more, however, intercrystalline corrosion was observed, but can be prevented by annealing the coated steel product in order to homogenize the coating.

The inventors have additionally recognized that the combination of the alloying elements Mn and Mg in the coating bath leads to an increase in the mechanical properties of the coating, with a further increase in strength during cold forming.

In accordance with the invention, the liquid-melt coating bath is to include 0.5-5 wt % Fe as obligatory element. Iron (Fe) in the coating bath (melt bath) satisfies the bath relative to severe dissolution of Fe from the steel product immersed in the coating bath. At an Fe content of less than 0.5 wt %, this effect is inadequate; at an Fe content of more than 5 wt %, in contrast, there may already be increased slag formation, which may adversely affect the coating quality of the steel product.

The alloying elements titanium (Ti) and zirconium (Zr) of the coating bath of the invention may make a contribution, individually or in combination, to a fine-crystalline structure of the anticorrosion coating generated by hot dip coating on the steel product. As a result of the fine-crystalline structure, harmful phases are finely distributed in the matrix of the anticorrosion coating, and hence the corrosion resistance is boosted. This effect can also be achieved by adding grain-refining prealloys. The inventors have recognized that with a Ti content or Zr content of less than 0.05 wt % in each case, no positive effect can be ascertained in terms of an increase in corrosion resistance. Nor is it possible to raise the above-described positive effect further at a Ti content or Zr content of more than 0.4 wt % in each case. Aspects of economics therefore set the upper limit here for the Ti content or Zr content of the coating bath. As well as boosting the corrosion resistance of the steel product, the addition of titanium may further increase the resistance of the anticorrosion coating toward salt water and alkalis.

According to one preferred refinement of the invention, the coating bath and/or anticorrosion coating further comprises one or more of the following elements:

| | |
|---|---|
| Si | 0.1-15 wt % |
| Ni | 0.05-2 wt % |
| Sb | 0.05-0.4 wt % |
| Cr | 0.05-0.4 wt % |
| Co | max. 0.4 wt % |
| Cu | max. 0.1 wt % |
| Zn | max. 0.1 wt %. |

Further accompanying elements, such as boron, carbon and/or nitrogen, may be present, likewise optionally, in traces in the coating bath and/or in the anticorrosion coating of the invention, in which case their individual amounts ought to amount to not more than 0.05 wt % and their total ought not to exceed a maximum figure of 0.15 wt %.

Silicon (Si) in the coating bath of the invention inhibits excessive growth of the reaction layer between the steel product and the anticorrosion coating applied to it, and is able accordingly to improve the forming capacity of the hot dip-coated steel product. The inventors have recognized that this positive effect can no longer be ascertained if the coating bath and/or the anticorrosion coating applied to the steel product has an Si content of less than 0.1 wt %. Where the coating bath and/or the anticorrosion coating applied to the steel product contains an Si content of more than 15 wt %, there may already be noticeable precipitation of silicon in crystal form, which may adversely affect the properties of the anticorrosion coating.

Nickel (Ni) in the coating bath and/or as alloying element of the anticorrosion coating applied to the steel product increases the latter's strength, especially its hot strength, by forming thermally stable precipitates. Nickel may be added at up to a maximum of 2 wt % to the coating bath of the invention.

Antimony (Sb), analogously to titanium, improves the resistance of the steel product of the invention toward salt water and alkalis. This positive effect was not observed by the inventors if the Sb content of the coating bath was less than 0.05 wt %. Nor was it possible, conversely, for this effect to be markedly further improved if the Sb content of the coating bath was more than 0.4 wt %.

Chromium (Cr) as an alloying element of the anticorrosion coating is able, at a level of up to 0.4 wt %, to bring about a reduction in the sensitivity of the coating to stress cracking corrosion.

Cobalt (Co) as an alloying element of the anticorrosion coating leads to an increase in the hot strength of the coating. Cobalt inhibits grain growth at higher temperatures. In particular, cobalt improves the hardness and ductility of the anticorrosion coating of the invention. Up to 0.4 wt % of cobalt is added optionally to the aluminum alloy of the coating bath and/or the anticorrosion coating.

Copper (Cu) as an alloying element of the anticorrosion coating leads likewise to an increase in the hot strength of the coating. Conventional aluminum alloys will be admixed with copper up to a level of 5 wt %. Copper contents in the range of 1-3 wt %, on the other hand, result in increased propensity toward hot cracking. Up to 0.1 wt % of copper is added optionally to the aluminum alloy of the coating bath and/or the anticorrosion coating.

Zinc (Zn) as an alloying element of the anticorrosion coating raises the strength and hardness of the coating, especially in conjunction with magnesium. At high levels of Zn, however, the risk of stress cracking corrosion increases. Up to 0.1 wt % of zinc is added optionally to the aluminum alloy of the coating bath and/or the anticorrosion coating.

Another refinement of the invention provides for the aluminum alloy of the coating bath and/or the anticorrosion coating of the steel product to have an Mn content in the range of 0.2-1.5 wt %. Tests by the inventors have shown that with an Mn content of this kind it is possible to achieve particularly high corrosion resistance, more particularly high resistance toward acids and alkaline media, and that as a result there is a significant reduction in slag formation, which can adversely affect the coating quality. These benefits are the case more particularly when, in accordance with a further preferred refinement of the invention, the aluminum alloy has an Fe content in the range from greater than 1.5 to 5 wt %, very preferably in the range from greater than 3 to 5 wt %.

One alternative refinement of the invention provides for the aluminum alloy of the coating bath and/or the anticorrosion coating of the steel product of the invention to have an Mn content in the range of 1.5-2 wt %. Tests by the inventors have shown that with an Mn content of this kind it is possible in turn to achieve particularly high corrosion resistance, more particularly high resistance towards acids and alkali media, and that likewise as a result of this there is a significant reduction in the formation of slag, which can adversely affect the coating quality. The Fe content of the aluminum alloy in this case is preferably selected such that it is in the range from greater than 1.5 to 5 wt %, more preferably in the range from greater than 1.5 to 3 wt %. These limits lead in each case to reduced formation of slag.

Another advantageous refinement of the invention is characterized in that the aluminum alloy of the coating bath and/or the anticorrosion coating of the steel product of the invention, in addition to Mn with the stated Mn content, has an Mg content in the range from 0.2 to less than 0.6 wt %. These limits also lead to reduced slag formation.

In order to obtain an optimum coating outcome it is an advantage if, in accordance with one preferred refinement of the method of the invention, the coating bath is operated with a coating bath temperature in the range from 650 to 750° C., preferably in the range from 680 to 750° C. At coating bath temperatures above and below these ranges, the coating outcome was occasionally not optimum, since in that case, for example, the reaction rate between the steel product and the liquid-melt coating bath was too low or the formation of slag was increased.

The surface activation of the steel product to remove passive oxides from the steel surface before immersion into the coating bath, causing the steel surface to consist very largely of metallic iron, can be accomplished in a variety of ways. One reliable procedure or refinement of the method of the invention in this respect is characterized in that the surface of the steel product is activated by pickling, using hydrochloric or sulfuric acid, for example. Subsequent rinsing, fluxing, and drying complete this activation and are intended to prevent reverse passivation by the ambient oxygen. The steel product thus treated is then heated to a temperature which corresponds to the temperature of the coating bath or is at most 50° C. above the temperature of the coating bath. This operational sequence is particularly advisable for hot-rolled starting material.

Another reliable procedure or refinement of the method of the invention with regard to the surface activation of the steel product is characterized in that the surface of the steel product is activated by pickling, using hydrochloric or sulfuric acid, for example, rinsing, and annealing, the annealing being carried out in a hydrogen-nitrogen atmosphere at a holding temperature in the range from 500 to 900° C., and in that the steel product thus treated is heated or cooled to a temperature which corresponds to the temperature of the coating bath or is at most 50° C. above the temperature of the coating bath. In order to complete the surface activation and to forestall reverse passivation of the surface, the $H_2$ fraction ought to be greater than or equal to 1 vol % $H_2$. With an $H_2$ fraction greater than 50 vol %, on the other hand, no additional positive effect is seen any longer, and so such high $H_2$ fractions should be avoided as uneconomic. For the same reason, the dew point of the $H_2$—$N_2$ atmosphere is to be in the range from −60° C. to 0° C. A dew point lower than −60° C. is difficult to accomplish technically and would also not bring any positive effect. With a dew point greater than 0° C., on the other hand, it would not be possible to rule out the steel surface being reoxidized, and so such high dew points should be avoided. This variant as well is advisable for hot-rolled starting material.

According to another variant of the method of the invention, the surface of the steel product is activated by annealing, the steel product being heated in a hydrogen-nitrogen atmosphere to a holding temperature in the range from 600 to 1100° C. In order to reduce any surface oxides present and to prevent them being formed during annealing, the $H_2$ fraction is to be greater than or equal to 1 vol % $H_2$. At an $H_2$ fraction of greater than 50 vol %, conversely, no additional positive effect is seen anymore, and so such high $H_2$ fractions should be avoided as uneconomic. For the same reason, the dew point of the $H_2$—$N_2$ atmosphere is to be in the range from −60° C. to 0° C. A dew point lower than −60° C. is difficult to realize technically and would also not bring any positive effect. With a dew point greater than 0° C., on the other hand, it would not be possible to rule out the steel surface being reoxidized, and so such high dew points should be avoided. The steel product thus treated is then heated or cooled to a temperature which corresponds to the temperature of the coating bath or is at most 50° C. above the temperature of the coating bath. This variant is particularly advisable with cold-rolled starting material, since in this case the microstructure of the steel can recrystallize at holding temperature. A holding temperature of less than 600° C. should be avoided, since otherwise the resulting recrystallization may not be complete. At a holding temperature of greater than 1100° C., conversely, there is a risk of coarse grains being formed. The residence time at holding temperature here is to be at least 30 seconds and not more than 90 seconds. If the residence time is less than 30 seconds, the resulting recrystallization may not be complete. At a holding time (residence time) of greater than 90 seconds, there is a risk of coarse grains being formed.

In order to prevent reverse passivation of the steel surface after annealing, in the case of those abovementioned variants of the surface activation of the steel product that entail the surface of the steel product being annealed, a further refinement of the method of the invention provides for the annealed steel product to be introduced into the coating bath in protected form through a snout in which there is a neutral or reductive inert-gas atmosphere. The inert gas used here is preferably nitrogen or a nitrogen/hydrogen mixture, at a dew point in the range from −60° C. to 0° C. for the reasons stated above.

If alloyed steel products are to be coated, utilizing the abovementioned annealing gas activation, by hot dip coating with an aluminum alloy of the invention, it may be useful to operate the reaction between metal and annealing gas during the anneal in such a way as to prevent external oxidation of those alloying elements of the steel that have affinity for oxygen (such as, for example, Mn, Al, Cr, B, Si, etc.). "Alloyed" here is intended to denote that the fraction of at least one alloying element from the group of Mn, Al, Si, and Cr is greater than or equal to 0.2 wt %, with the Mn fraction being not more than 30.0 wt %, the fraction of aluminum or silicon not more than 10.0 wt %, and the Cr fraction not more than 5.0 wt %. In such cases, according to a further refinement of the method of the invention, the annealing of the steel product would preferably be carried out such that additionally preoxidizing of the steel product, surface nitriding of the steel product, controlled dew point working, or combinations of these measures are carried out. "Preoxidation" refers to an oxidation-reduction treatment of the steel surface. In this case, for example, in a first step, during the heating phase to holding temperature and at the start of the residence time at holding temperature, the steel surface is exposed for at least 1 second up to a maximum of 15 seconds to an atmosphere containing at least 0.1 vol % up to a maximum of 3.0 vol % oxygen, in order deliberately to form FeO. If the selected preoxidation time and oxygen fraction are too low, this FeO formation cannot take place sufficiently. If preoxidation time and oxygen fraction are set at too high a level, too much FeO is formed, and can no longer be reduced back completely during the residence time in the hydrogen-nitrogen atmosphere at holding temperature. In the case of the "surface nitriding", during the heating phase to holding temperature and at the start of the residence time at holding temperature, the steel surface is exposed for at least 1 second up to a maximum of 15 seconds to an atmosphere comprising at least 3.0 vol % up to a maximum of 10.0 vol % $NH_3$, in order to effect deliberate near-surface formation of nitrides in the steel, which block oxidation pathways for the alloying elements exhibiting oxygen affinity. If the nitriding time and $NH_3$ fraction selected are too low, the level of such nitride formation may be too low. If nitriding time and $NH_3$ fraction are set at too high a level, no additional positive effect may be observed any longer. Controlled dew point working means that within the stated or preferred limits, within different furnace zones, the dew point is set deliberately for the particular steel alloy in order to cause the selective oxidation of the alloying elements in accordance with the Wagner criterion to proceed internally rather than externally.

A further advantageous refinement of the method of the invention provides for the annealing of the steel product to be carried out in such a way that decarburization is achieved, more particularly edge decarburization of the steel product.

With edge decarburization, carbon is withdrawn from near the surface of the steel product through deliberate annealing gas metal reaction, by reaction with gaseous $H_2O$. For this purpose, the dew point of the atmosphere is adjusted to a range from −20° C. to 0° C., so that sufficient $H_2O$ is present in the annealing gas atmosphere. Such edge decarburization is especially advisable if the carbon fraction of the steel alloy is in the range from 0.1 wt % to 0.4 wt %. By this means, the formability of the steel substrate is improved.

In a further refinement of the method of the invention, the step of coating the surface-activated steel product using a coating bath comprising an aluminum alloy of the invention may be followed by a thermal, chemical and/or mechanical aftertreatment. For instance, a further advantageous refinement of the method of the invention provides for the surface of the hot dip-coated steel product to be dressed. By dressing the surface it is possible to generate any desired roughness or surface structure on the steel product coated in accordance with the invention.

Another advantageous refinement of the method of the invention is characterized in that the surface of the hot dip-coated steel product is anodized. This allows the wear resistance of the anticorrosion coating of the invention to be boosted, while at the same time the coating can also be provided with decorative coloration. Anodizing leads to an increase in the abrasion resistance which is well above that of a conventional 1.4301-grade stainless steel.

The invention is illustrated in more detail below with working examples.

A steel product, typically a flat steel product, is coated with an aluminum coating of the invention by brief immersion of the steel product into a liquid-melt coating bath—hence the term "hot dip aluminizing" which can also be used here. In order to achieve effective wetting and adhesion of the coating material on the steel substrate, a pretreatment is carried out in order to activate the steel surface. This pretreatment and the hot dip aluminization take place preferably in series and also in a continuous operating sequence. This operating sequence comprises the following steps:

a) providing the steel product, preferably flat steel product, in a hot-rolled or cold-rolled state
b) cleaning the surface of the steel product (optional)
c) activating the surface of the steel product
d) hot dip aluminizing, i.e., hot dip coating in a coating bath composition of the invention based on aluminum
e) thermal, chemical, or mechanical aftertreatment (optional in each case).

The surface activation removes passive oxides from the surface of the steel product, causing this surface after activation to consist very largely of metallic iron. This can be achieved in a variety of ways, specifically as follows:

c1) Chemical surface activation, comprising pickling, rinsing, fluxing, and drying of the steel surface and conditioning of the steel product at bath immersion temperature before it is immersed into the coating bath. This surface activation or operating sequence is advisable particularly for hot-rolled steel starting material.

c2) Combined chemical/annealing gas activation, comprising pickling, rinsing, annealing in a hydrogen-nitrogen atmosphere (having a dew point of −60° C. to 0° C.) with a holding temperature in the range from 500° C. to 900° C., and cooling to bath immersion temperature. Optionally here it is possible for an overaging operation to be carried out before the surface-activated steel product is immersed into the coating bath. This surface activation or operating sequence is also advisable for hot-rolled steel starting material.

c3) Annealing gas activation, comprising heating to a holding temperature in the range from 600° C. to 1100° C. in hydrogen-nitrogen atmosphere (with a dew point of −60° C. to 0° C.) and cooling to bath immersion temperature. Here likewise it is possible optionally to carry out an overaging operation before the surface-activated steel product is immersed into the coating bath. This variant of the surface activation or operating sequence is advisable particularly with cold-rolled steel starting material, since the microstructure of this material can recrystallize at the holding temperature.

Independently of the choice of operating step sequence c1), c2), or c3), the liquid-melt coating bath is operated with a coating bath temperature in the range from 650° C. to 750° C., preferably in the range from 680° C. to 750° C. The surface-activated steel product to be coated is cooled preferably to a bath immersion temperature in the range from 650° C. to 800° C.

If a steel product made of alloyed steel is to undergo hot dip aluminization in accordance with the invention, using one of operating step sequences c2) or c3), it may be necessary to operate the annealing gas-metal reaction during the anneal in such a way as to prevent external oxidation of the alloying elements with affinity for oxygen (such as Mn, Al, Cr, B, Si, etc.). For this purpose the annealing gas-metal reaction would additionally comprise, for example, a pre-oxidation, a surface nitriding, a controlled dew point working, or combinations of these additional measures. It is likewise within the scope of the invention for edge decarburization to be carried out in parallel with the surface activation, in order to improve the formability of the steel product.

In order to prevent reverse passivation of the steel surface after annealing in the case of operating step sequence c2) or c3), the transfer of the steel product, cooled to bath immersion temperature, into the coating bath is accomplished by way of a snout, in which there is a controlled nitrogen or nitrogen/hydrogen inert gas atmosphere that is neutral or reductive relative to the steel substrate.

Through optional dressing of the surface of the steel product coated in accordance with the invention it is possible to apply a desired roughness or surface structure. In an optional downstream anodizing operation, the wear resistance of the coating of the invention on the steel product can be boosted. Anodizing brings about an increase in the abrasion resistance, which is greater by a factor of about 3 than that of a conventional stainless steel (1.4301).

The coating of a steel product subjected in accordance with the invention to hot dip aluminization by means of a coating bath and one of the operating step sequences as described above comprises, further to aluminum and unavoidable impurities, the following elements:

|         |    |                                  |
| ------- | -- | -------------------------------- |
|         | Mn | 0.2-2 wt %                       |
| and/or  | Mg | 0.2-7 wt %                       |
|         | Fe | 0.5-5 wt % as obligatory element |
|         | Ti | 0.05-0.4 wt %                    |
| and/or  | Zr | 0.05-0.4 wt %.                   |

Table 1 reports a number of working examples for the chemical composition of a metallic coating bath (melt bath) of the invention. The V1 and V3 melts reported in table 1 feature particularly high corrosion resistance even with respect to acids and alkaline media. The melt of type V2 possesses increased resistance toward seawater and alkalis.

A flat steel product provided with an anticorrosion coating of the invention is suitable for all common joining techniques such as soldering, welding, adhesive bonding, etc., and can be subjected to single-stage or multistage processing by either cold forming or hot forming to give a component. A flat steel product or component of this kind is suitable for general mechanical engineering, aircraft, automotive, and marine construction, construction of household appliances, building construction, especially for exterior facings, decorative elements of everyday use, such as casings for cell phones and notebook computers, for example, and also mining equipment. The use of flat steel products with the anticorrosion coating of the invention, or of components produced from such flat steel products, is particularly advantageous in the sector of the chemical industry and also the food industry, examples being statically loaded plant components and articles such as silo containers, insulators, beverage cans, etc. In the case of the latter application, the aluminum-based anticorrosion coating of the invention allows replacement by low-alloy steels of the stainless steels prescribed in the food industry according to EU Regulation 1935/2004 and also the EU Guidelines on meals, alloys used as food contact materials (Mar. 9, 2001).

TABLE 1

| Test melt | Elements [wt %] | | | | |
| --- | --- | --- | --- | --- | --- |
| | Mn | Mg | Si | Fe | Al |
| V1 (AlMnSi) | 0.98 | | 3.23 | 0.96 | bal. |
| V2 (AlMg) | | 5 | | 3.5 | bal. |
| V3 (AlMgMn) | 2 | 7 | | 3.5 | bal. |

What is claimed is:

1. A steel product having a metallic anticorrosion coating of an aluminum alloy, wherein in addition to aluminum and unavoidable impurities the aluminum alloy comprises:

1.5-2% by weight Mn;

1.5-3% by weight Fe;

at least one of 0.05-0.4% by weight Ti or 0.05-0.4% by weight Zr; and optionally, 0.2-7% by weight Mg.

2. The steel product of claim 1 wherein the aluminum alloy further comprises at least one of 0.1-15% by weight Si;

0.05-2% by weight Ni;

0.05-0.4% by weight Sb;

0.05-0.4% by weight Cr;

at most 0.4% by weight Co;

at most 0.1% by weight Cu; or at most 0.1% by weight Zn.

3. The steel product of claim 1 wherein the aluminum alloy includes both Mn and Mg, with the aluminum alloy including 0.2-0.6% by weight Mg.

* * * * *